US006754901B2

(12) United States Patent
Yamanaka

(10) Patent No.: US 6,754,901 B2
(45) Date of Patent: Jun. 22, 2004

(54) DISK PLAYER

(75) Inventor: Takashi Yamanaka, Tokyo (JP)

(73) Assignee: Tanashin Denki Co., Ltd., Tokyo (JP)

( * ) Notice: Subject to any disclaimer, the term of this patent is extended or adjusted under 35 U.S.C. 154(b) by 295 days.

(21) Appl. No.: 10/105,167

(22) Filed: Mar. 26, 2002

(65) Prior Publication Data

US 2003/0107974 A1 Jun. 12, 2003

(30) Foreign Application Priority Data

Dec. 7, 2001 (JP) ........................................ 2001-373465

(51) Int. Cl.[7] ........................................... G11B 17/04
(52) U.S. Cl. ..................................................... 720/626
(58) Field of Search ............................. 369/75.1, 75.2, 369/77.1, 77.2; 720/619, 624, 626, 645

(56) References Cited

U.S. PATENT DOCUMENTS

| 4,498,162 | A | * | 2/1985 | Schatteman | ................ | 369/77.1 |
| 4,539,670 | A | * | 9/1985 | Inaba et al. | ................ | 369/77.1 |
| 5,022,023 | A | * | 6/1991 | Toyoguchi | ................ | 369/77.1 |
| 5,119,354 | A | * | 6/1992 | Umesaki | .................... | 369/30.9 |
| 5,173,893 | A | * | 12/1992 | Morikawa et al. | ......... | 369/77.1 |
| 5,173,894 | A | * | 12/1992 | Kido | ........................ | 369/77.1 |
| 5,828,641 | A | * | 10/1998 | Abe et al. | .................. | 369/75.1 |
| 6,222,811 | B1 | * | 4/2001 | Sakurai et al. | ............. | 369/77.1 |
| 6,288,982 | B1 | * | 9/2001 | Kato | ....................... | 369/30.36 |

FOREIGN PATENT DOCUMENTS

JP         10-116459         10/1996

* cited by examiner

*Primary Examiner*—David Ometz
(74) *Attorney, Agent, or Firm*—Reed Smith LLP; Stanley P. Fisher, Esq.; Juan Carlos A. Marquez, Esq.

(57) ABSTRACT

It is an object of the present invention to provide a disk player by which position detection of a disk inserted and discrimination about whether the disk is a large one or a small one can be performed through a simple construction. A circuit board is provided either one side of a pair of detection levers which are rotated to be spread/closed while mutually interlocking with insertion of a disk or a disk guide board to which the detection levers are attached and a contact is provided on the other, and a rotary switch is composed of the circuit board and the contact so that through difference in output signal of the rotary switch, position detection of a disk and discrimination about whether the disk is a large one or a small one are performed.

2 Claims, 16 Drawing Sheets

DISK PLAYER

BACKGROUND OF THE INVENTION

1. Field of the Invention

The present invention relates to a disk player in which position detection of a disk inserted and discrimination about whether the disk is a large one or a small one can be performed through a simple construction.

2. Description of the Related Art

Japanese Patent Application Laid-Open No. Hei 10-116459 discloses a disk position detection means as follows. That is, a pair of levers and an interlock member for interlocking these levers are provided, and respective first and second switches are arranged in the respective vicinities of one side lever and the interlock member. When a disk is not inserted, the first switch is turned on and the second switch is turned off, and when one of large and small disk is inserted to a loading start position, the first switch is turned off by the rotation of a lever to start a loading motor. While a small diameter disk is inserted, even when the quantity of rotation of the lever is maximum, since such quantity of rotation is small, the second switch is not turned on. While a large diameter disk is inserted, since the lever rotates largely, the second switch becomes on, and based on these conditions, discrimination about whether the disk is a large one or a small one is performed.

In the construction in which the switches are arranged in the respective vicinities of the lever and the interlock member as described above, the construction is complex since two switches are employed, and there is a difficulty in designing since a space for arranging the respective switches has to be ensured. Setting the positional relationship among the levers, the interlock member, and the respective switches in a high resolution manner is difficult, and thus there is a fear that malfunctions occurs when positional relationship of high resolution is not achieved.

SUMMARY OF THE INVENTION

The present invention was developed to solve these problems, and it is an object of the present invention to provide a disk player in which designing and manufacturing thereof are easy and in which discrimination about whether the disk is a large one or a small one and detection of a disk position can be performed through a simple construction.

The present invention is a disk player in which a pair of detection levers attached to a support member are pressed to be spread out by a disk inserted from an outside to rotate in open directions while mutually interlocking and are rotated to return in close directions while mutually interlocking after a disk passes, and the apparatus is constructed wherein a circuit board is provided on one of the support member and the detection levers of one side and a contact coming in contact with contact points of the circuit board is provided on the other thereof to construct a rotary switch by the circuit board and the contact, and position detection of a disk inserted and discrimination about whether the disk is a large one or a small one are performed according to difference in output signal of the rotary switch.

As the support member, a disk guide board can be utilized, and thus the construction can be further simplified.

DESCRIPTION OF THE PREFERRED EMBODIMENT

Figure 1:
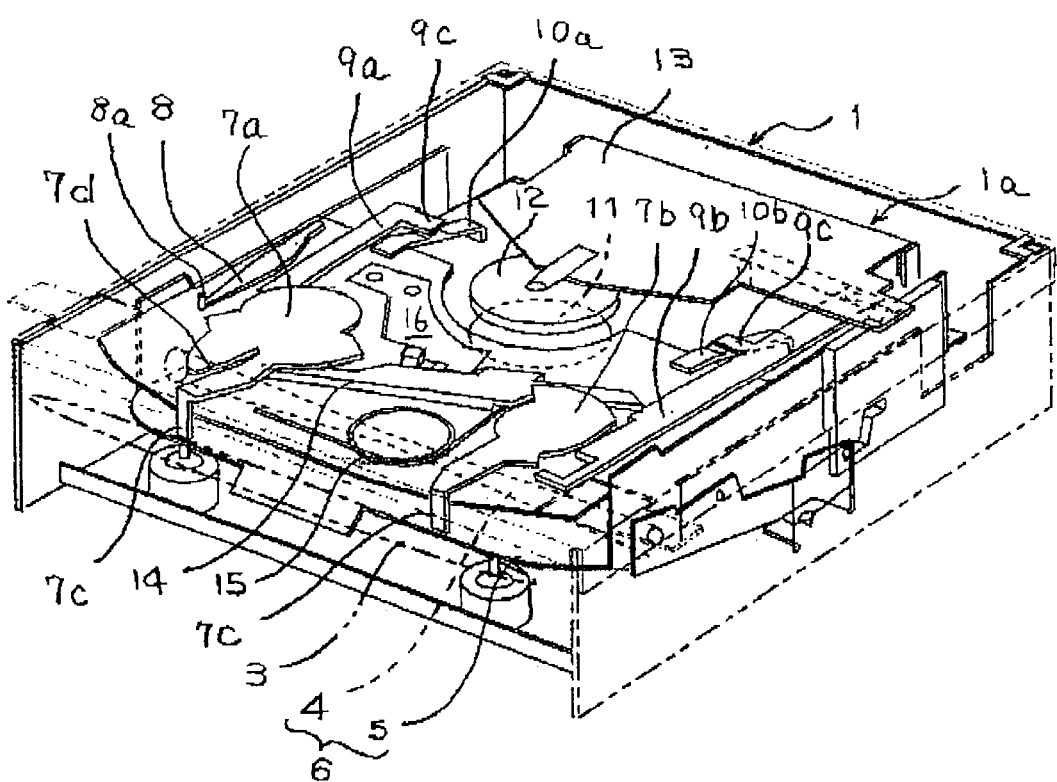
FIG. 1 is a perspective view illustrating a main part of a disk player.

An embodiments of the present invention is explained, referring to FIG. 1 to FIG. 16. A disk player 1 shown in FIG. 1 has, in the front face thereof, a disk insertion slot 3 into which a disk 2 is inserted, and in the inner part thereof, a feed roller 4 and a disk guide board (support member) 5 that sandwich the disk 2 inserted through the insertion slot 3.

Attached to the disk guide board 5 are a pair of detection levers 7a, 7b disposed in right and left sides, an engaging lever 8, a pair of rod plates 9a, 9b disposed in right and left sides, a pair of stop levers 10a, 10b disposed in right and left sides, etc. A turntable 11 and a damper 12 are arranged inside the reproducing apparatus 1, and the damper 12 is constructed so as to be abutted/separated against/from the turntable 11 by vertical rotation of a rotation plate 13 supporting the damper 12.

Figure 6:
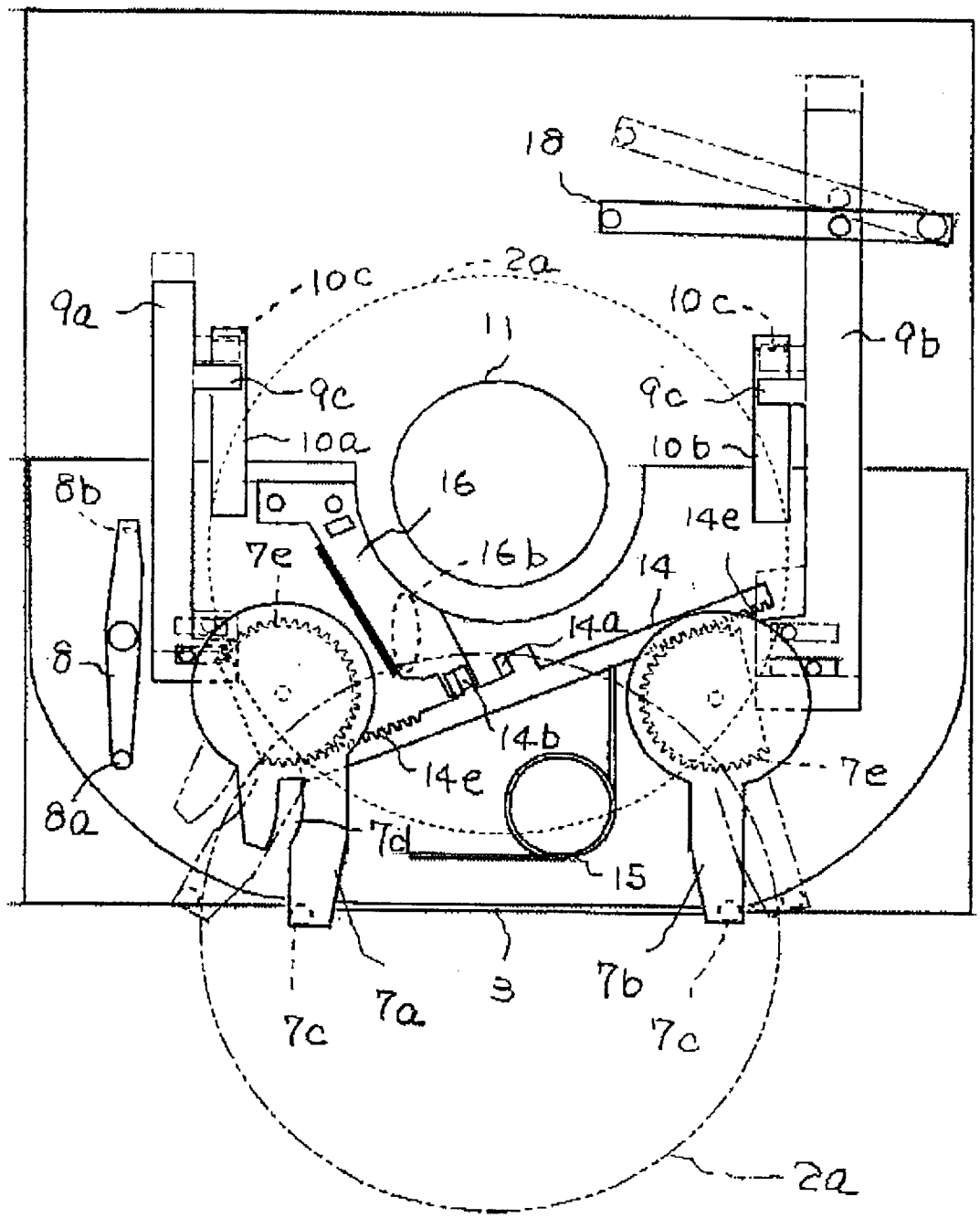
FIG. 6 is a plan view illustrating the main part of the disk player.

The pair of detection levers 7a, 7b have abutting pieces 7c for causing disks 2a, 2b to abut an end in the side of the insertion slot 3 and have gear portions 7e (refer to FIG. 6) in the rotational central portion thereof. Further, a circular arc groove 7d is formed in the detection lever 7a of the left side as shown in FIG. 6, and when the detection lever 7a is opened maximumly, a first pin 8a of the engaging lever 8 is inserted into the groove 7d to hold the detection lever 7a at an open position. Rack 14e provided in an interlock member 14 is meshed with the gear portions 7e of the detection levers 7a, 7b in a crossing manner so that both detection levers 7a, 7b interlock each other to be rotated in open/close directions. A spring 15 stretched and laid between the interlock member 14 and the disk guide board 5 so that the pair of detection levers 7a, 7b are constantly energized in the close direction.

Figure 2:
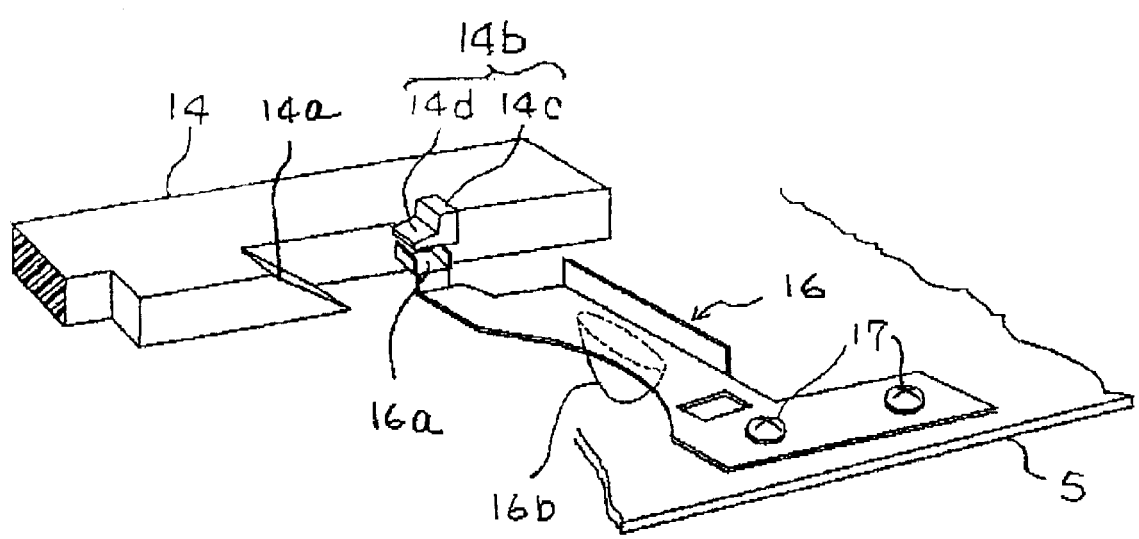
FIG. 2 is a perspective view illustrating a relationship between an interlock member and a detection plate.
Figure 3:
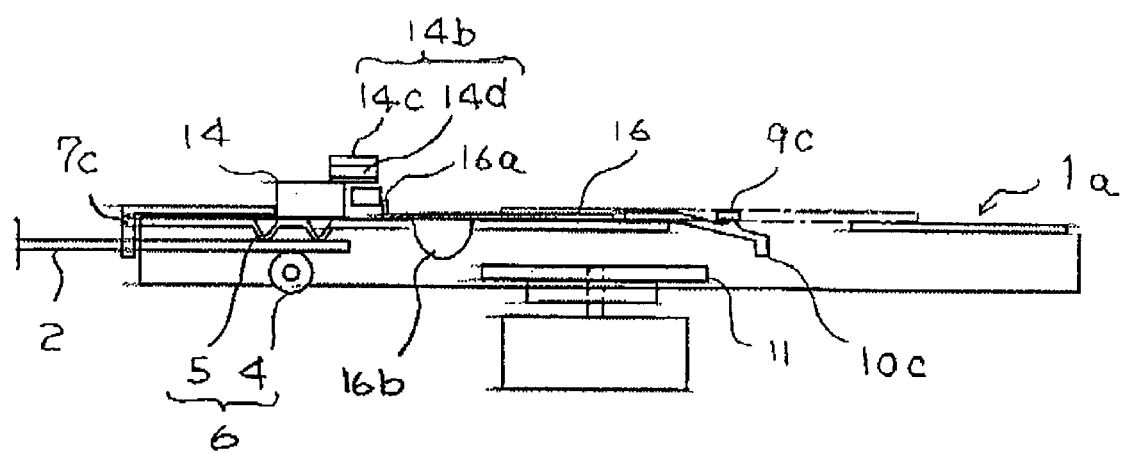
FIG. 3 is a schematic side view illustrating a state where a small diameter disk is inserted.

One end of a detection plate 16 is fixed at a position between the insertion slot 3 and the damper 12 on the guide board by screws 17. This detection plate 16 is formed by a thin leaf spring as shown in FIG. 2, and a hook 16a formed in a distal end of the detection plate is optionally meshed with a slanting cam 14a and an engaging piece 14b formed in the interlock member 14. A slidingly-abutted piece 16b of synthetic resin is attached on a central portion of the underside of the detection plate 16 as shown in FIG. 3, and this slidingly-abutted piece 16b is positioned on a disk carrier passage.

The width of the engaging piece 14b of the interlock member 14 is formed so as to be approximately the same as the width of the hook 16a, and the engaging piece 14b is divided into two by a protrusion 14c and a receiving face 14d in the width direction. The slanting cam 14a and the engaging piece 14b are separated approximately only for the distance of the width of the hook 16a, and when the interlock member 14 and the hook 16a are at initial positions, the engaging piece 14b is positioned over the hook 16a. The interlock member 14 moves resisting the spring 15, the hook 16a is pushed upward to ascend, passing between the slanting cam 14a and the engaging piece 14b, and then the interlock member 14 returns by the spring 15. Thus, the receiving face 14d goes into under the hook 16a. Then, a side face of the protrusion 14c abuts the engaging piece 14b to inhibit returning operation of the interlock member 14 halfway so that the interlock member 14 is retained at a position where the interlock member 14 is slightly rotated from the initial position thereof.

Figure 4:
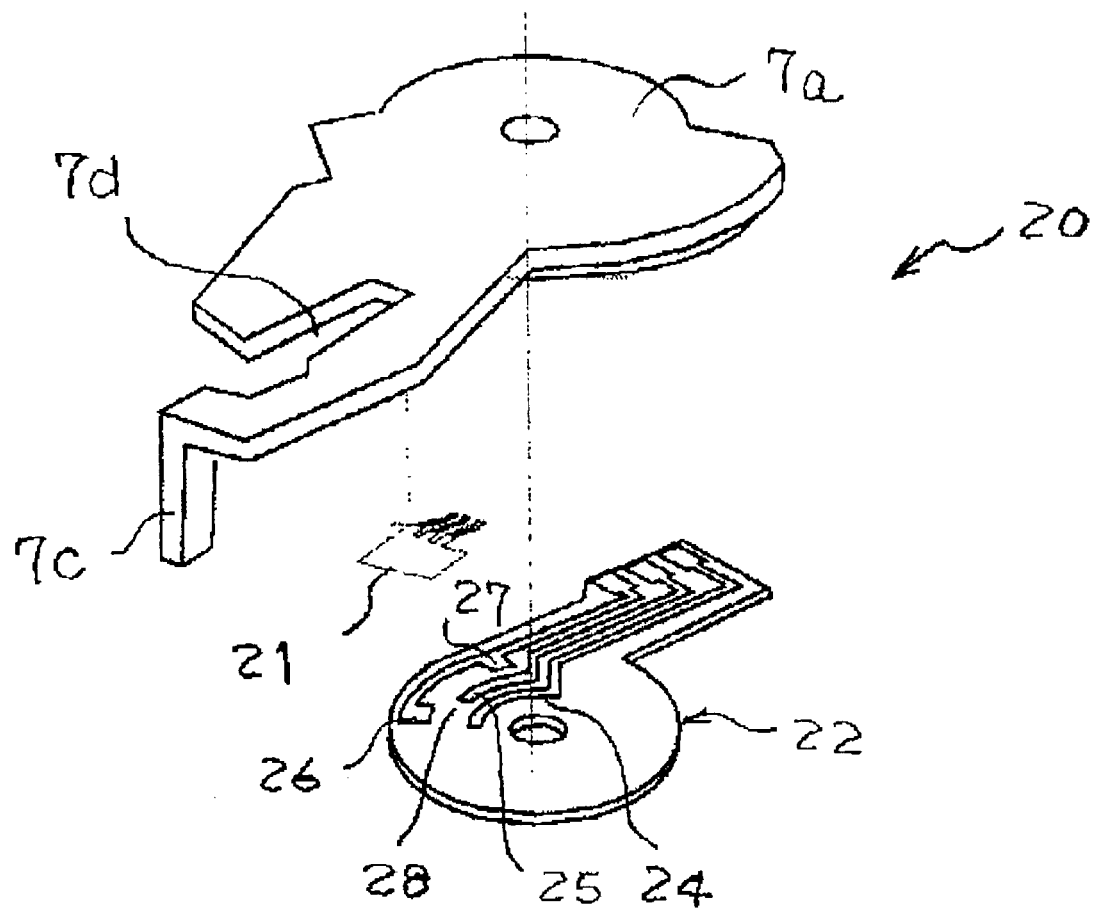
FIG. 4 is an exploded perspective view of a rotary switch.

FIG. 4 shows a rotary switch 20. This rotary switch is composed of a contact 21 provided on the underside of the detection lever 7a of the left side and a circuit board 22 provided on the top face of the disk guide board 5. The circuit board 22 has a long contact 24 coming in contact with the contact 21 covering the whole rotation area thereof, a short contact 25 coming in contact with the contact 21 in an area from the rotation midway of the contact 21 to the rotation finishing end thereof, a starting end contact 26 coming in contact with the contact 21 when the contact 21 is at the initial position thereof, and a finishing end contact 27 coming in contact with the contact 21 when the contact 21 rotates up to the finishing end thereof, and the starting end contact 26 and the finishing end contact 27 are connected to each other, as shown in FIG. 5.

A first switch 30 is composed by the combination of the long contact 24, the short contact 25, the finishing end contact 27, and the contact 21, and the second switch 31 is composed by the combination of the long contact 24, the short contact 25, and the contact 21.

Figure 5:
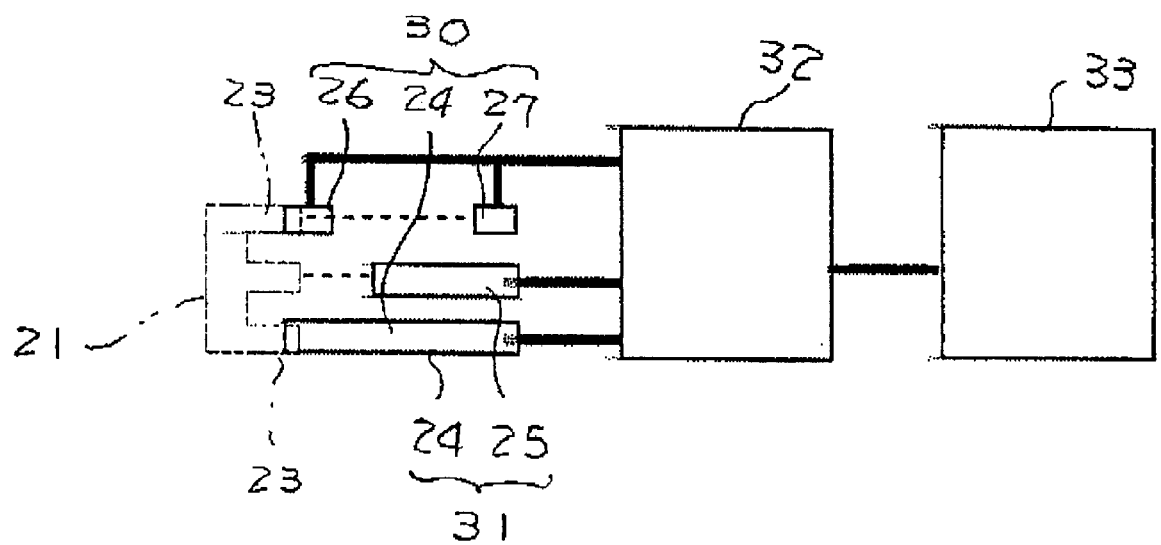
FIG. 5 is a circuit diagram including the rotary switch.
Figure 9:
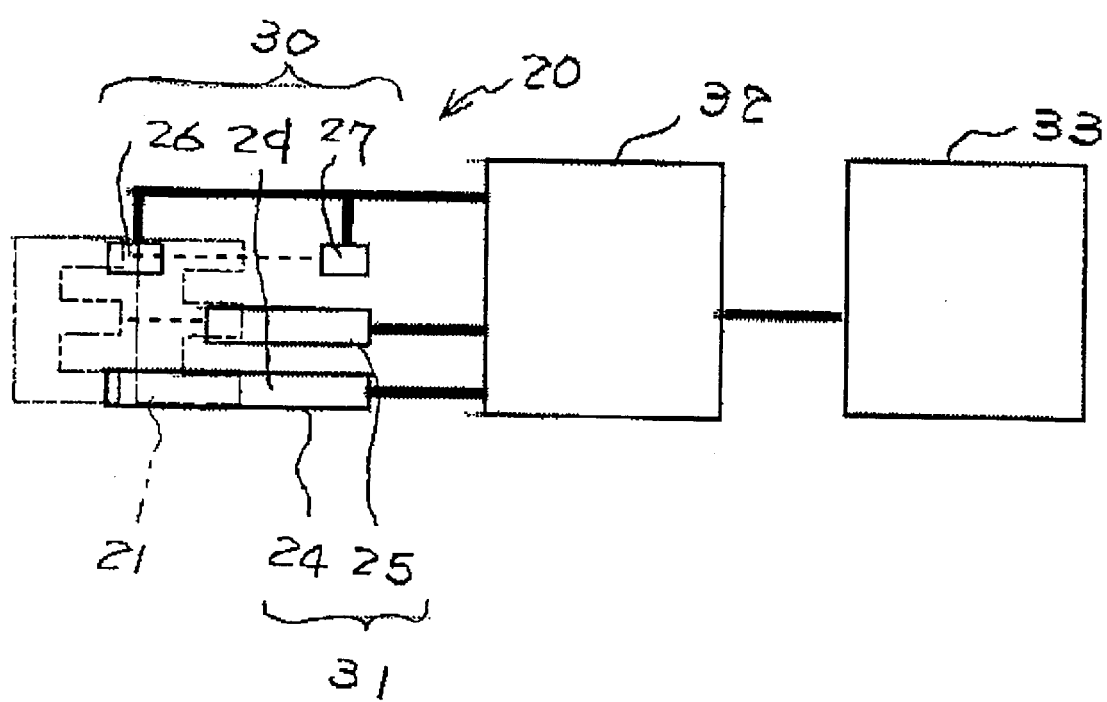
FIG. 9 is a circuit diagram including the rotary switch.
Figure 10:
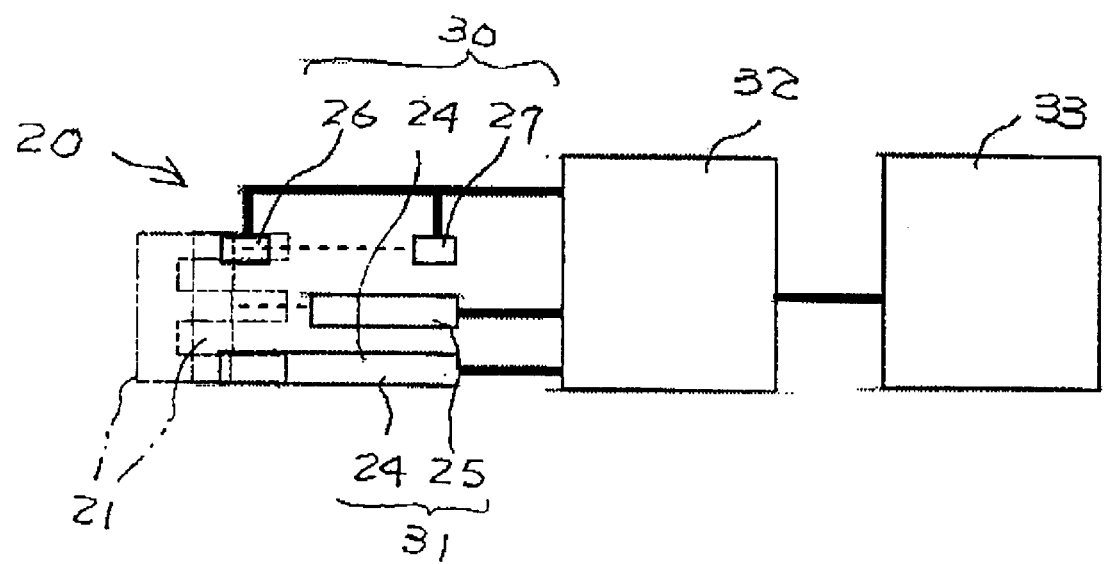
FIG. 10 is a circuit diagram including the rotary switch.
Figure 16:
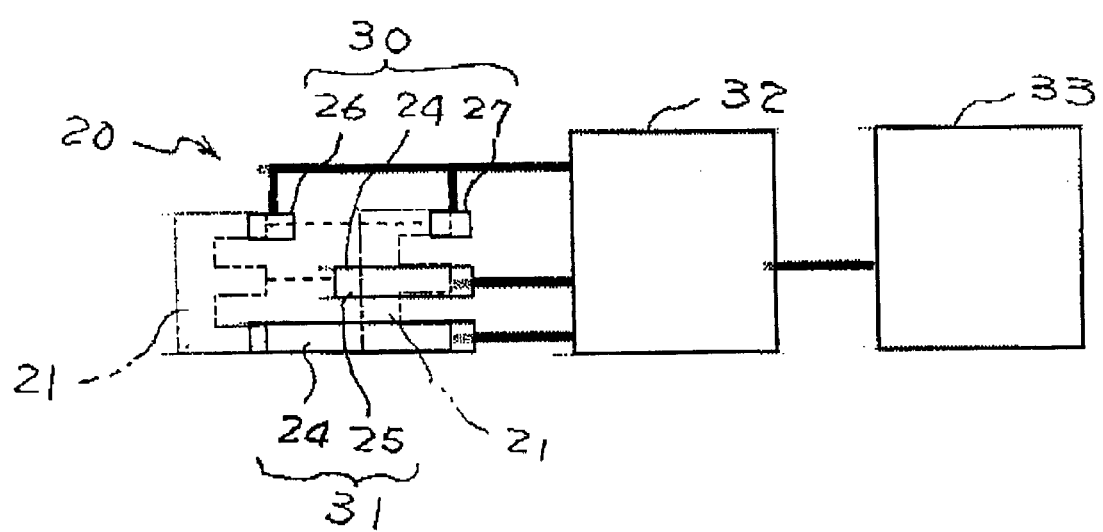
FIG. 16 is a circuit diagram including the rotary switch.

When the detection levers 7a, 7b are at the initial positions thereof, the contact 21 comes in contact with the long contact 24 and the starting end contact 26 as shown in FIG. 5 (at this time the first switch 30 is turned on, and the second switch 31 is turned off). When the detection levers 7a, 7b rotate slightly, the contact 21 is in contact only with the long contact 24 as shown in FIG. 10 (at this time the first and second switches 30, 31 are both turned off). When the detection levers 7a, 7b further rotate, the contact 21 comes in contact with the long contact 24 and the short contact 25 as shown in FIG. 9 (at this time the first switch 30 is turned off and the second switch 31 is turned on to start a loading motor). When the detection levers 7a, 7b rotate maximumly, the contact 21 comes in contact with the long contact 24, the short contact 25, and the finishing end contact 27 as shown in FIG. 16 (at this time the first and second switches 30, 31 are both turned on).

That is, the rotary switch 20 outputs on- and off-signals as follows with the rotations of the detection levers 7a, 7b.

| | first switch 30 | second switch 31 |
|---|---|---|
| initial position | on | off |
| slightly rotate | off | off |
| further rotate | off | on |
| maximumly rotate | on | on |

These on- and off-signals are outputted to a logic circuit 32, and the logic circuit 32 sends the computation result thereof to a control circuit 33.

The first pin 8a for being fitted into the long groove 7d and a second pin 8b against which the outer periphery of a large diameter disk is abutted are formed in the engaging lever 8. When the large diameter disk 2b is carried from the insertion slot 3 toward a playback position, the engaging lever 8 works so as to cause the second pin 8b be pressed to the outer periphery of the disk 2b to rotate, to cause the first pin 8a to go into the long groove 7d, and to hold the abutting piece 7c of the detection lever 7a at a maximum rotation position where the abutting piece 7c does not abut the outer periphery of the large diameter disk 8b.

The rod plates 9a, 9b have pressing pieces 9c so as to position stopper portions 10c of the tips of stop levers 10a, 10b on the disk carrier passage when the pressing pieces 9c are meshed with the stop levers 10a, 10b as shown in FIG. 3. When the small diameter disk 2a is carried over the turntable 11, the stopper portions 10c abut the outer periphery of the small diameter disk 2a so that the center of the disk corresponds to the center of the rotation of the turntable 11. When the rod plates 9a, 9b move forwardly so that the engagement between the stop levers 10a, 10b and the pressing pieces 9c is released, the stopper portions 10c elastically return to move to the outside of the disk carrier passage.

Figure 11:
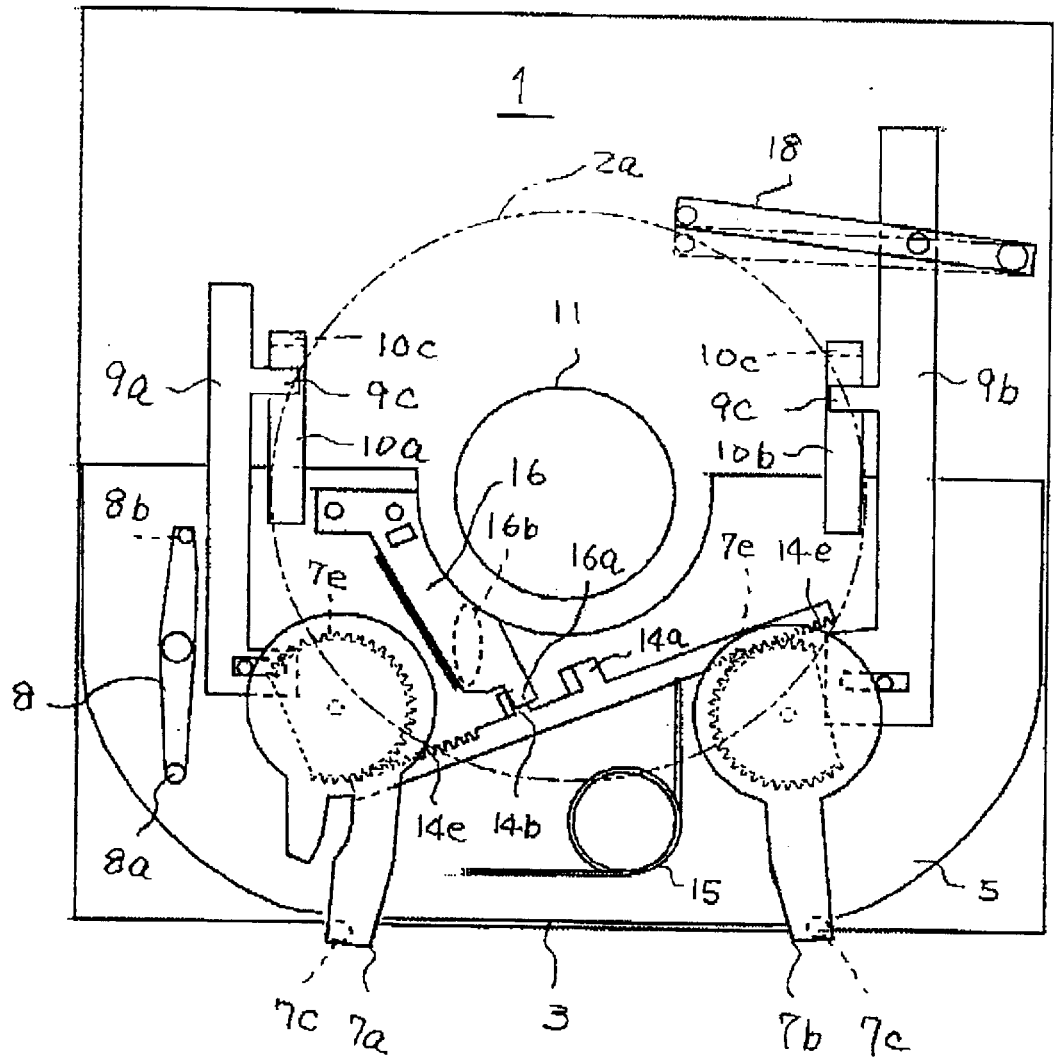
FIG. 11 is a plan view illustrating the main part of the disk player.
Figure 12:
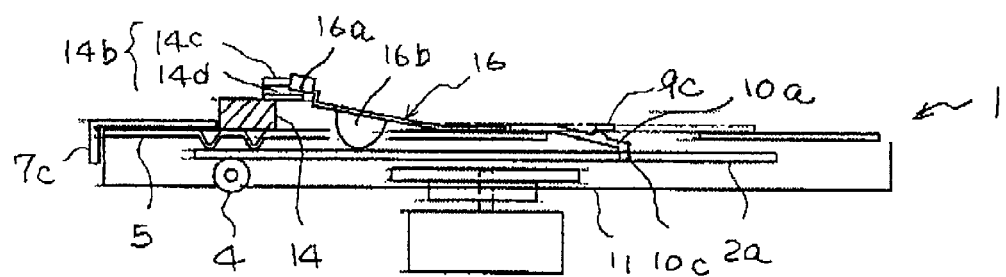
FIG. 12 is a schematic side view illustrating a state where a small diameter disk is inserted.

The rod plate 9b of the right side is engaging a trigger 18 positioned in an inner side from the turntable 11 as shown in FIG. 11. When the disks 2a, 2b are carried to the inside of the apparatus, the trigger 18 is pushed by the disks 2a, 2b to be rotated to cause the damper 12 to approach the turntable 11. By causing the trigger 18 to engage the rod plate 9b, abutting positions between the trigger 18 and the disks 2a, 2b can be set in accordance with the diameter of a disk.

Figure 7:
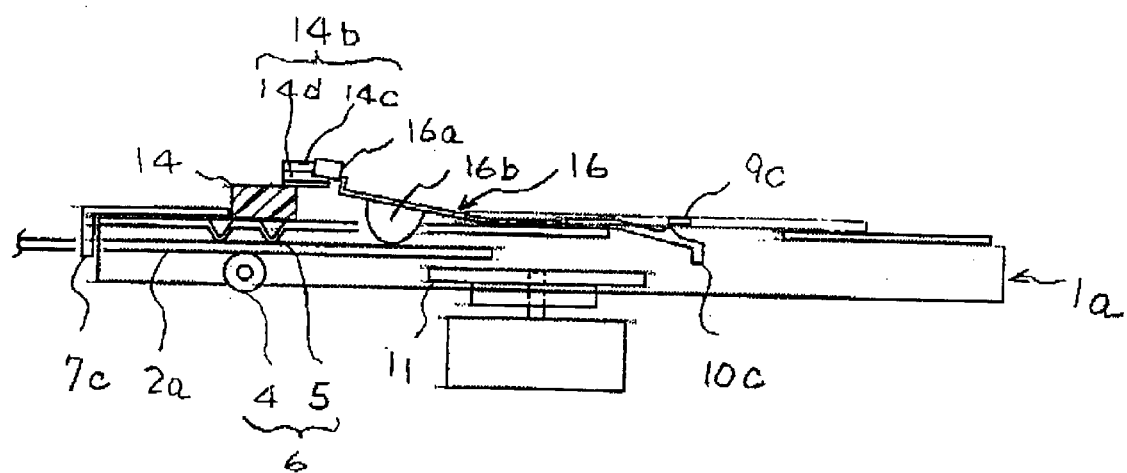
FIG. 7 is a schematic side view illustrating a carrier state of a small diameter disk.
Figure 8:
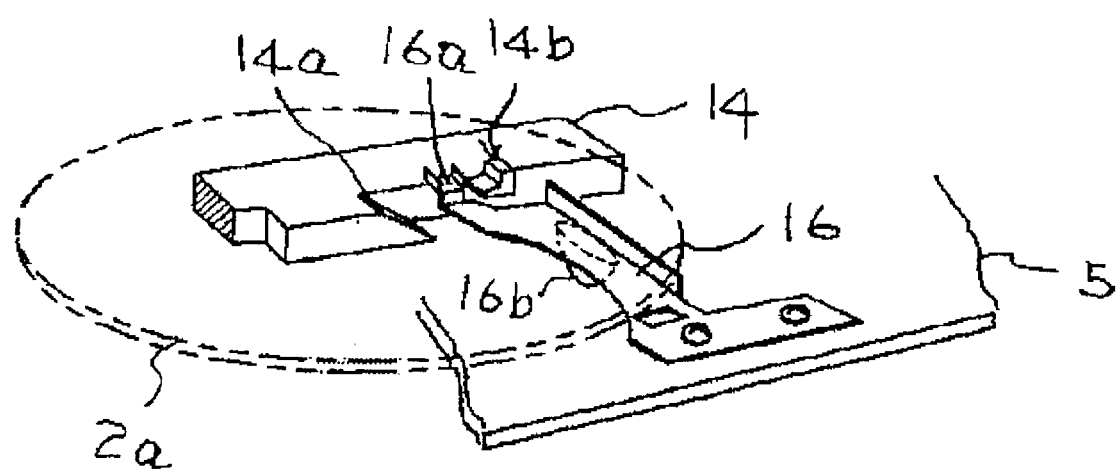
FIG. 8 is a perspective view illustrating a relationship between the interlock member and the detection plate.

In the disk player described above, as shown in FIG. 6, in the state where a disk is not inserted, the pair of detection levers 7a, 7b are at solid line positions and rotate up to virtual line positions in the open direction when the small diameter disk 2a is inserted. At this time the interlock member 14 moves in the left direction in the drawing only for the distance of the width of the hook 16a while resisting the spring 15. The hook 16a is positioned between the engaging piece 14b and slanting cam 10a as shown in FIG. 8, and the slidingly-abutted piece 16b of the detection plate 16 runs onto the top face of the small diameter disk 2a and pushes up the hook 16a up to a position higher than that of the receiving face 14d as shown in FIG. 7. Then, when the detection lever 7a further rotates, the contact 21 comes into contact with the long contact 24 and the short contact 25 as shown in FIG. 9 to start the loading motor.

When the center of the small diameter disk 2a passes between the abutting pieces 7c of the detection levers 7a, 7b, the detection levers 7a, 7b, the interlock member 14, and the rod plates 9a, 9b return by the spring 15. Since the slidingly-abutted piece 16b of the detection plate 16 is still running onto the top face of the small diameter disk 2a, the receiving face 14c of the engaging piece 14b goes into under the hook 16a, and the protrusion 14d abuts the side face of the hook 16a to inhibit the return of the interlock member 14 on the halfway thereof to hold the contact 21 at a position where the contact 21 abuts only the long contact 24 as shown in FIG. 10.

When the center of the small diameter disk 2a comes to correspond to the center of the turntable 11 as shown by a virtual line in FIG. 11, the trigger 18 is pushed by the disk 2a to be rotated to cause the damper 12 to approach the turntable 11. The outer periphery of the small diameter disk 2a abuts the stopper portions 10c to be held at this position. Thereafter, the feed roller 4 descends, and with this descent the small diameter disk 2a is placed on the turntable 11, the damper 12 attaches the small diameter disk 2a to the turntable 11, and the disk guide board 5, the slidingly-abutted piece 16b, and the feed roller 4 are separated from the disk 2a, causing a state where playback is possible.

Now, when an eject operation is performed, the feed roller 4 ascends after the damper 12 is separated from the small diameter disk 2a, and the small diameter disk 2a is lifted up from the turntable 11 by the feed roller 4 to be abutted against the disk guide board 5. The feed roller 4 rotates, the small diameter disk 2a is carried toward the insertion slot 3, and the contact 21 of the rotary switch 20 moves from the position where the rotary switch 20 abuts the long contact 24 and the short contact 25 to the position where the rotary switch 20 abuts only the long contact 24 after the center of the disk 2a passes between the abutting pieces 7c so that the loading motor stops. In this state, the small diameter disk 2a can be pinched to be taken out.

Figure 13:
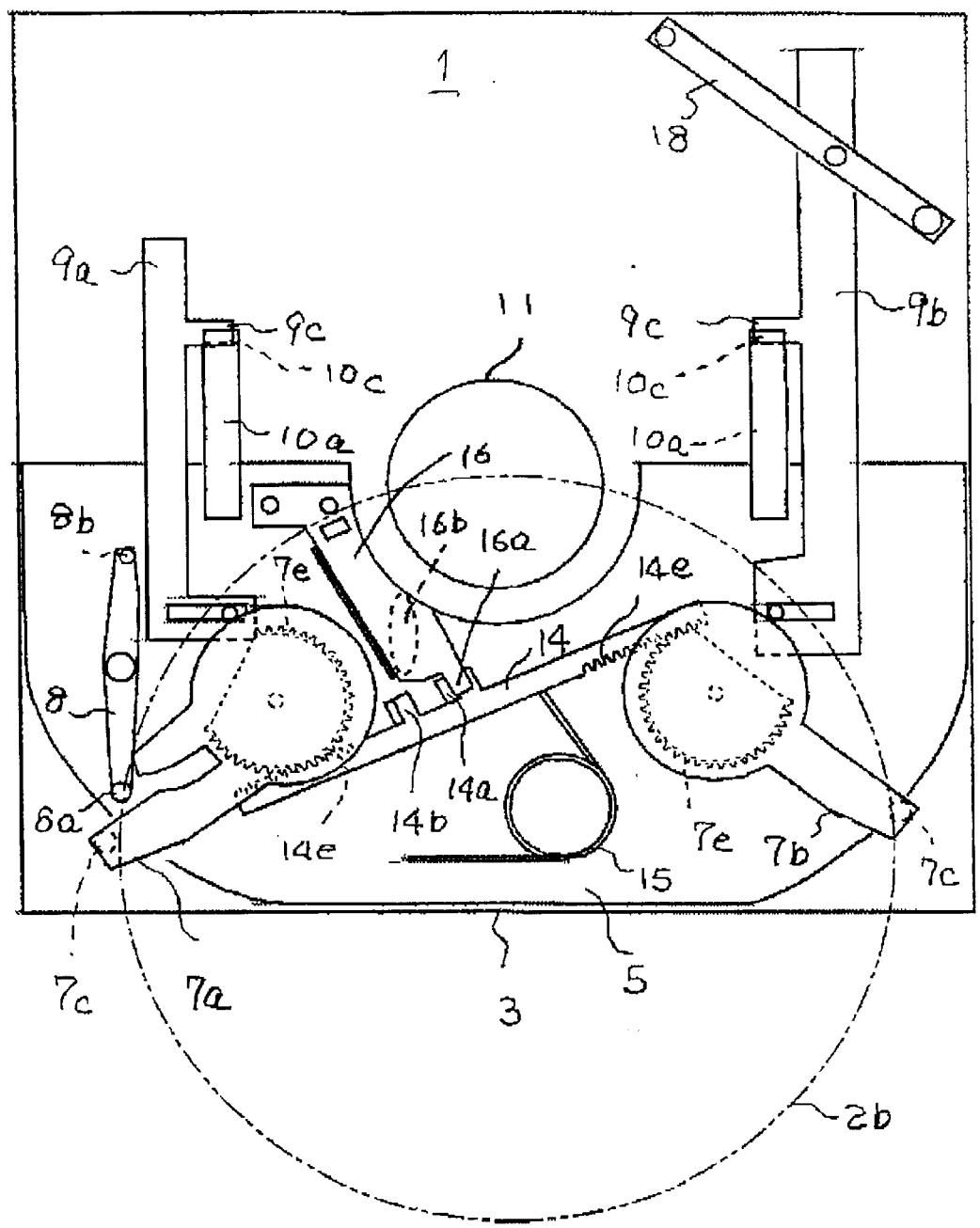
FIG. 13 is a plan view illustrating the main part of the disk player.

Then, as shown in FIG. 13, when the large diameter disk 2b is inserted so that the contact 21 of the rotary switch 20 comes into contact with the long contact 24 and the short contact 25 as shown in FIG. 9, the loading motor is started to start the carrying the disk. In the process the disk 2b is inserted, since the slidingly-abutted piece 16b of the detection plate 16 runs onto the top face of the large diameter disk 2b, the hook 16a is pushed up from the guide board 5.

Figure 14:
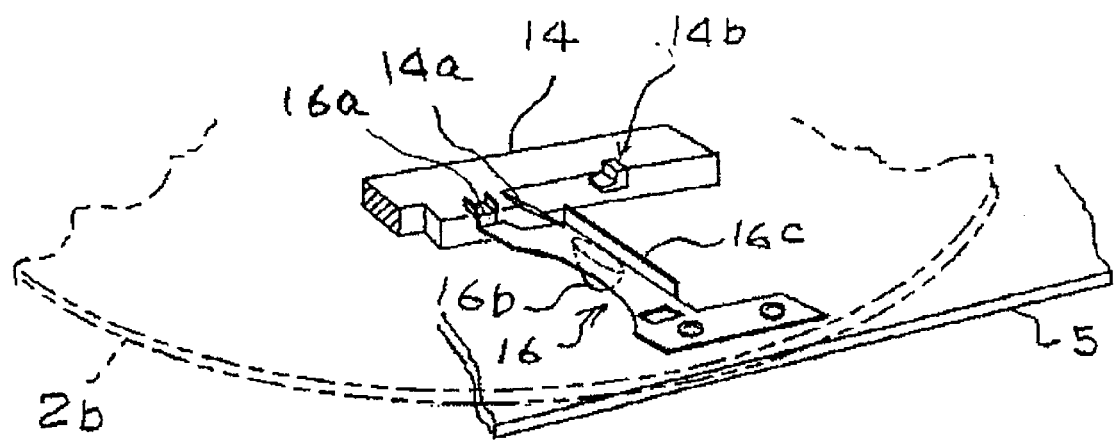
FIG. 14 is a perspective view illustrating a relationship between the interlock member and the detection plate.
Figure 15:
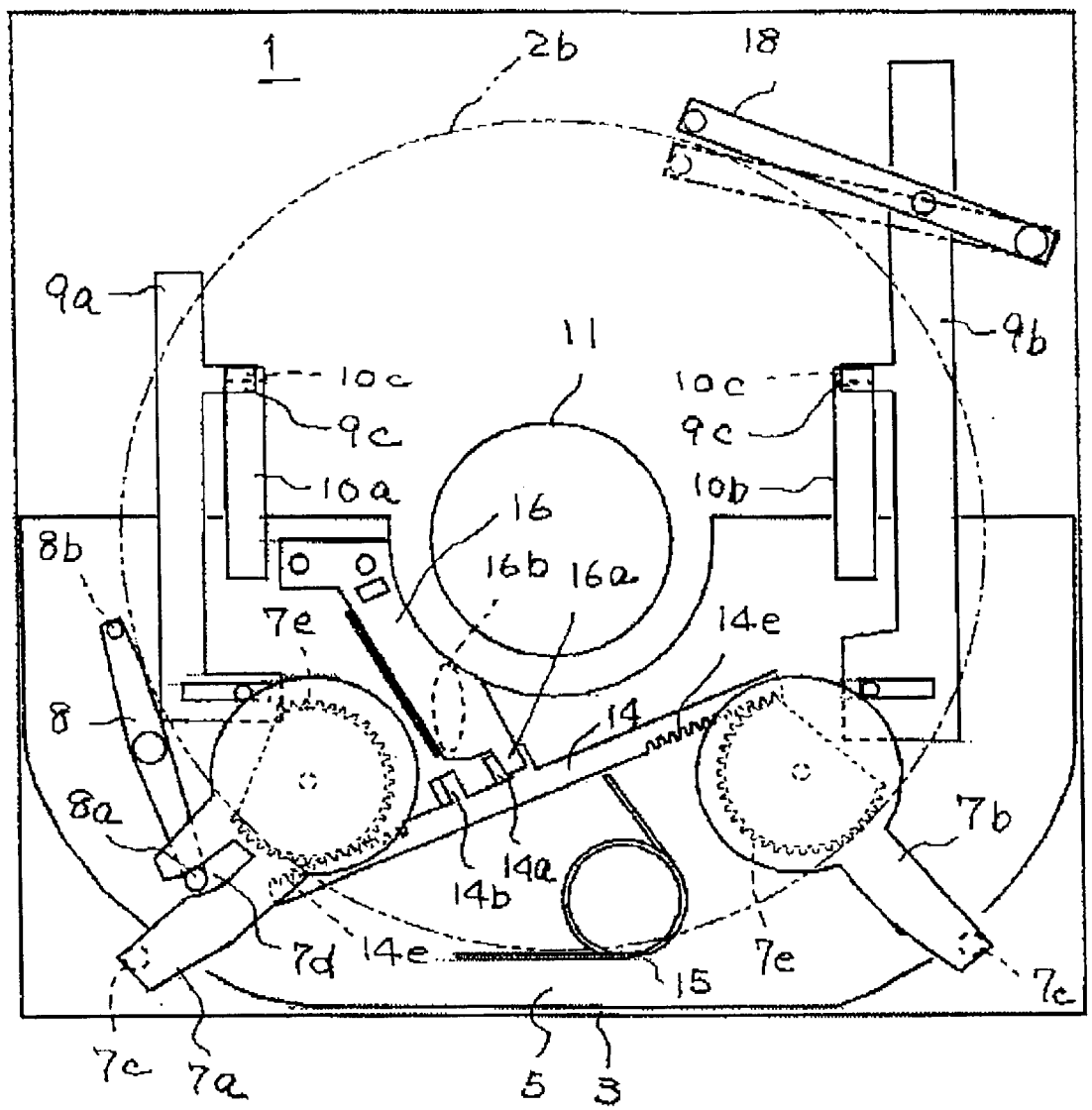
FIG. 15 is a plan view illustrating the main part of the disk player.

The detection levers 7a, 7b largely rotate in the open directions with the carrier of the large diameter disk 2b, and the interlock member 14 also largely moves to the left, resisting the spring 15. As shown in FIG. 14, the hook 16a of the detection plate 16 is further pushed upward by the slanting cam 14a of the interlock member 14.

When the center of the large diameter disk 2b reaches a position between the abutting pieces 7c, the second pin 8b of the engaging lever 8 is pressed by the outer periphery of the disk so as to cause the first pin 8a to go into the long groove 7d of the detection lever 7a. Accordingly, even after the center of the large diameter disk 2b passes between the abutting pieces 7c, the detection levers 7a, 7b are held at positions where they have rotated maximumly, and when the large diameter disk 2b is further carried toward the playback position, the outer periphery of the large diameter disk 2b is separated from the second pin 8b. In this process, the trigger 18 rotates to lower the clamper 12 to attach the large diameter disk 2b on the turntable 11.

When the detection levers 7a, 7b are at positions where they have rotated maximumly, the contact 21 of the rotary switch 20 comes into contact with the long contact 24, the short contact 25, and the finishing end contact as shown in FIG. 16, the first switch 30 and the second switch 31 together output on-signals, and the logic circuit 32 detects that the large diameter disk 2b is at the playback position. Then, when the eject operation is performed in order to take the large diameter disk 2b out, the feed roller 4 ascends after the clamper 12 ascends to lift the large diameter disk 2b from the turntable 11 so as to press the large diameter disk 2b against the disk guide board 5.

After the feed roller 4 rotates to carrier the large diameter disk 2b toward the disk insertion slot 3 so that the center of the large diameter disk 2b passes between the abutting pieces 7c of the right and the left, the detection levers 7a, 7b rotate in the close direction so that the contact 21 of the rotary switch 20 comes into contact with the long contact 24 and the short contact 25. At this time the first and second switches 30, 31 output on- and off-signals to the logic circuit 32, respectively, and the control circuit 33 stops the loading motor.

As described above, with the present invention, in a disk player in which a pair of detection levers attached to a support member are pressed to be spread out by a disk inserted from an outside to rotate in open directions while mutually interlocking and are rotated to return in close directions while mutually interlocking after a disk passes, a circuit board is provided on one of the support member and the detection levers of one side and a contact coming in contact with contact points of the circuit board is provided on the other thereof to construct a rotary switch by the circuit board and the contact, and position detection of a disk inserted and discrimination about whether the disk is a large one or a small one are performed according to difference in output signal of the rotary switch. Thus, a space for arranging switches as in a conventional apparatus is unnecessary, and difficulty in designing can be solved through a simple construction. With respect to a circuit board and a contact which constitute a rotary switch, since either one is provided on the detection lever and the other is provided on the support member supporting the detection lever, setting the positional relationship between the circuit board and the contact in a high resolution manner is very easy, and thus there is no fear that malfunction occurs.

Specifically, by utilizing a disk guide board as the support member, the construction becomes further simple.

What is claimed is:

1. A disk player in which a pair of detection levers attached to a support member are pressed to be spread out by a disk inserted from an outside to rotate in open directions while mutually interlocking and are rotated to return in close directions while mutually interlocking after a disk passes, wherein a circuit board is provided on one of the support member and the detection levers of one side and a contact coming in contact with contact points of the circuit board is provided on the other thereof to construct a rotary switch by the circuit board and the contact, and position detection of a disk inserted and discrimination about whether the disk is a large one or a small one are performed according to difference in output signal of the rotary switch.

2. The disk player according to claim 1, wherein the support member is a disk guide board.

* * * * *